United States Patent [19]

Stodt

[11] 4,341,127

[45] Jul. 27, 1982

[54] MULTIPLE-SPEED TRANSMISSION OF COUNTERSHAFT CONSTRUCTION WHICH CAN BE SHIFTED UNDER LOAD

[75] Inventor: Enno Stodt, Heidenheim, Fed. Rep. of Germany

[73] Assignee: Voith Getriebe KG, Fed. Rep. of Germany

[21] Appl. No.: 973,020

[22] Filed: Dec. 26, 1978

[30] Foreign Application Priority Data

Jan. 4, 1978 [DE] Fed. Rep. of Germany ....... 2800267

[51] Int. Cl.³ .............................................. F16H 3/10
[52] U.S. Cl. ......................................... 74/333; 74/359; 74/360
[58] Field of Search .......................... 74/333, 359, 360

[56] References Cited

U.S. PATENT DOCUMENTS

| 2,529,379 | 11/1950 | Dumont | 74/333 X |
|---|---|---|---|
| 2,706,544 | 4/1955 | Schuman | 74/333 X |
| 3,285,088 | 11/1966 | Atsumi et al. | 74/359 |
| 3,858,455 | 1/1975 | Sisson et al. | 74/360 |
| 3,893,345 | 7/1975 | Sisson et al. | 74/359 X |
| 4,145,935 | 3/1979 | Herlitzek | 74/331 |

FOREIGN PATENT DOCUMENTS

| 1152310 | 8/1963 | Fed. Rep. of Germany | 74/333 |
|---|---|---|---|
| 1806501 | 7/1969 | Fed. Rep. of Germany | |
| 1625179 | 6/1970 | Fed. Rep. of Germany | 74/325 |
| 2535700 | 2/1977 | Fed. Rep. of Germany | |
| 1385236 | 11/1964 | France | 74/333 |

Primary Examiner—Wm. Carter Reynolds
Attorney, Agent, or Firm—Ostrolenk, Faber, Gerb & Soffen

[57] ABSTRACT

A multiple speed transmission with a plurality of shafts and gears and divided into a number of shift units. Insofar as possible, the respective corresponding shafts and gears among the shift units have substantially the same pitch dimensions. In a multi-speed, single direction transmission, there are two gear and clutch carrying shafts. A clutch in one shift unit joins a gear fixed to the shaft of that shift unit with one or the other of two gears rotatable with respect to the shaft of that shift unit. An additional gear is fixedly mounted on the shaft. The two of such shift units are engaged with different respective ones of their gears being in direct or indirect engagement. For a reversing direction transmission, an intermediate, and therefore direction reversing, gear is interposed between the gears of one interengaged set of gears. In another embodiment, a direction reversing shift unit is connected to one of the two shift units of a single direction transmission. The direction reversing shift unit also comprises a clutch for joining one of two gears with means for driving the main gear of that shift unit in one or the opposite direction.

16 Claims, 4 Drawing Figures

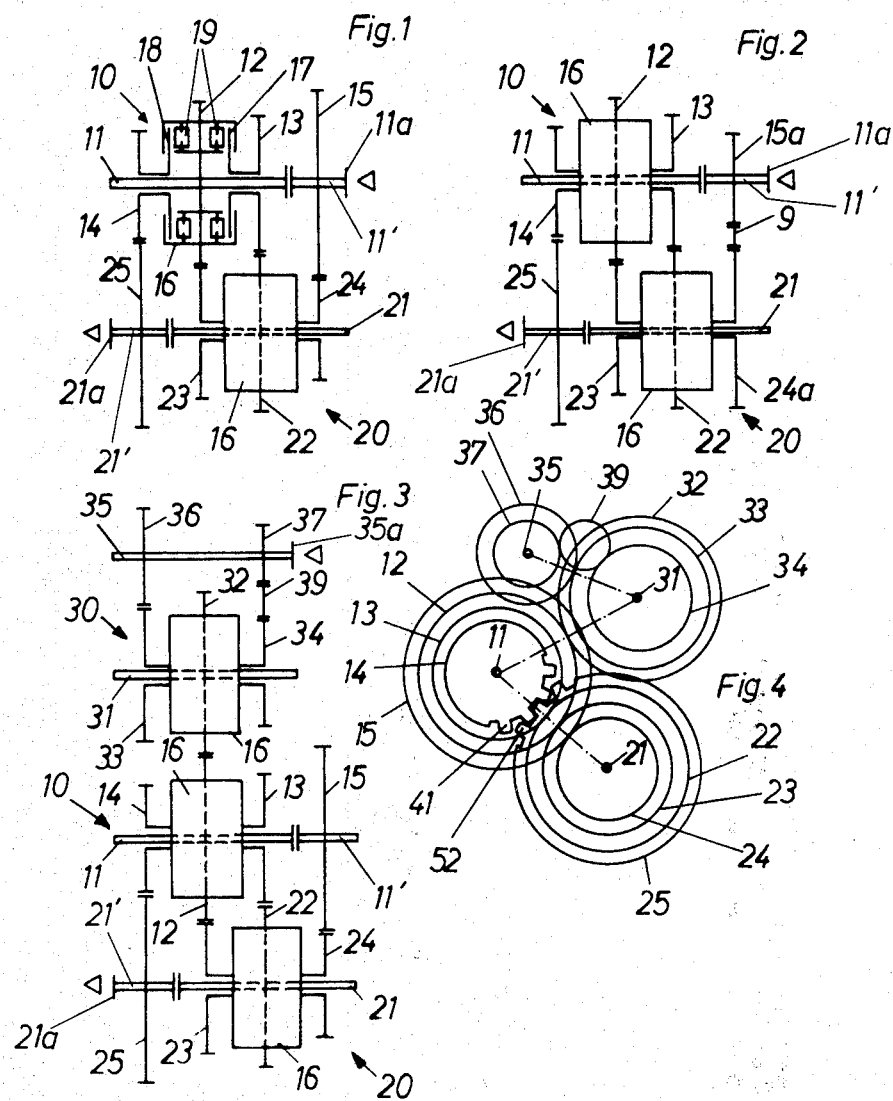

MULTIPLE-SPEED TRANSMISSION OF COUNTERSHAFT CONSTRUCTION WHICH CAN BE SHIFTED UNDER LOAD

The present invention relates to a transmission of countershaft construction which can be shifted under load.

BACKGROUND OF THE INVENTION

In known transmissions of this type (shown in German Patent Specification No. 18 06 501 laid open July 3, 1969, German Patent Specification No. 25 35 700 laid open Feb. 10, 1977), it has been attempted, through the use of as many identical elements as possible, for instance, gears having the same number of gear teeth, and also by modular assembling of the shifting units, to reduce the cost of manufacture of such gears and be able to vary the number of gear ratios.

SUMMARY OF THE INVENTION

It is the object of the present invention to further reduce the cost of manufacture of such gears while being able to vary the number of gear ratios.

One embodiment of the transmission of the invention produces four speed ratios with the use of only two shafts. Not only are the shafts and shift couplings or units identical to each other, but at least 2×2 gears may be identical to each other. In order to obtain specific speed ratios, it is also possible to make the two shift couplings on units dissimilar to a certain extent with respect to their gear pitch diameters. In this connection, of course, all gears which are in engagement with each other must have the same center-to-center distance.

Another advantage is that the transmission of the invention can be variously modified in other embodiments. It can have four forward speeds. In this case 4×2 gears are identical to each other. Alternatively, it can have three forward speeds and one reverse speed.

It is particularly advantageous for the above noted transmission with only forward speeds to be supplemented by a reversing transmission so that the entire transmission has, for example, four forward and four reverse speeds. In this way, a particularly large number of identical structural parts can be used, helping to realize the invention. Such a transmission, however, in addition, also has another substantial advantage which in the known transmissions (for instance, of German Laid-Open Patent Specification No. 18 06 501) can only be obtained for itself alone. The various planes determined by every pair of transmission shafts can form numerous different angles. In other words, the transmission can be folded as desired and numerous different center-to-center distances between input and output shafts can be produced. Transmissions can be produced with numerous different forms of housings, but with the same inner parts. The transmission of the invention can thus be easily adapted to different requirements.

The foregoing and other objects and features of the invention will become apparent from the following description and accompanying drawings.

BRIEF DESCRIPTION OF THE DRAWINGS

Different counter-shaft load-shift transmissions in accordance with the invention are shown diagrammatically in the accompanying drawings:

FIG. 1 schematically shows a transmission with four forward speeds;

FIG. 2 schematically shows a transmission with three forward speeds and one reverse speed;

FIG. 3 schematically shows a transmission with four forward speeds and four reverse speeds;

FIG. 4 schematically shows the transmission of FIG. 3 but in a side view and in a folded condition.

DESCRIPTION OF THE PREFERRED EMBODIMENTS

The transmission shown in FIG. 1 comprises a first shift unit 10 and a second shift unit 20 which are arranged on axes which are parallel to each other. The first shift unit 10 is shown in longitudinal section. The shift unit 20 in the first embodiment and the shift units 10 and 20 of all of the other embodiments are structurally the same as the shift unit 10 in FIG. 1 and are thus not illustrated in detail.

The shift unit 10 includes a coupling shaft 11. Shaft 11 and all other below described shafts (21, 31, 35) are rotatably supported at fixed locations in respective frames (not shown). A drive flange 11a imparts rotation to the shaft 11 via a shaft 11'. A gear 12, referred to as the middle gear, is fixed for rotation on the shaft 11. Two freely rotatable gears 13 and 14 are arranged on the coupling shaft 11, one on each side of the middle gear 12. The gears 13 and 14 have different respective pitch diameters and will accordingly hereafter be referred to as the large side gear 13 and the small side gear 14.

To one end of the clutch shaft 11, there is also fixedly connected said shaft 11' to which is fastened another gear 15 referred to as the outer gear. The four gears 12 to 15 all have different respective pitch diameters. In one suitable size gradation, the sizes of the gears proceed from the outer gear 15, which is the largest, through the middle gear 12, the large side gear 13 and the small side gear 14.

The two freely rotatable side gears 13 and 14 are connectable by respective disk clutches 17 and 18 to the middle gear 12. The disk clutches 17 and 18 are arranged in a clutch housing 16 which is fastened to the middle gear 12 and the disk clutches can be actuated by hydraulic pistons 19. The disk clutches of the second shift unit 20 and the disk clutches of the transmissions shown in the other Figures are identical to the disk clutches 17 and 18 of the first shift unit 10.

The second shift unit 20 on its coupling shaft 21 can advantageously be developed identically to the first shift unit 10. It is merely laterally reversed with respect to the first shift unit 10. In FIG. 1, the gears of the second shift unit 20 bear reference numbers which are ten more than the reference numbers of the corresponding gears of the first shift unit. The driven flange 21a has rotation imparted to it.

Gears 15 and 25 are further away, as measured along the axis of shafts 11, 21, from gears 12, 22, respectively, than at least one of gears 13, 23 or 14, 24, respectively.

The two shift units 10 and 20 are assembled so that their gears mesh with each other as follows: 14 with 25; 12 with 23; 13 with 22; 15 with 24. All just noted gear pairs have the same center-to-center distance.

Drive and driven flanges 11a, 21a are arranged on the shafts 11' and 21', respectively, to which are fastened the outer gears 15 and 25, respectively. The opposite ends of the clutch shafts 11 and 21 are available for the feeding of pressure fluid to the respective disk clutches.

The transmission shown in FIG. 1 has four speeds. The first speed, which has the greatest gear reduction, can be connected by closing the disk clutch 18. This couples the drive flange 11a, shaft 11, middle gear 12, small side gear 14, fixed outer gear 25, shaft 21 and driven flange 21a. The second speed can be connected by closing the disk clutch 17. This couples the drive flange 11a, shaft 11, large side gear 13, middle gear 22, shaft 21 and driven flange 21a. The third and fourth speeds can be connected in corresponding manner by closing respective ones of the disk clutches of the second shift unit 20. In the third speed, one clutch in second shift unit 20 couples drive flange 11a, shaft 11, middle gear 12, large side gear 23, middle gear 22, shaft 21 and driven flange 21a. In the fourth speed, the other clutch in second shift unit 20 couples drive flange 11a, shaft 11, fixed outer gear 15, small side gear 24, middle gear 22, shaft 21 and driven flange 21a.

FIG. 2 shows a modification of the transmission of FIG. 1. The gears 15 and 24 which form the fourth speed in the transmission shown in FIG. 1 have merely been replaced by three gears 15a, 9 and 24a, which, due to the presence of the extra gear 9, thus forms the reverse speed gearing. All other parts of the transmission in FIG. 2 are identical to the corresponding parts in FIG. 1 and are provided with the same reference numbers. In another modification (not shown) the gears 14 and 25 of FIG. 1 are replaced by three gears forming a reverse speed gearing.

In FIG. 3, a reversing transmission has been provided in front of a four-speed transmission of the type shown in FIG. 1. The reversing transmission comprises a shift unit 30 and an input counter shaft 35. The shift unit 30 substantially corresponds to the shift unit 10 of FIG. 1, and includes the following parts: a clutch shaft 31, a middle gear 32 fixed to the shaft 31, a large side gear 33 freely rotatably mounted to the shaft 31 at one side of gear 32, a small side gear 34 freely rotatably mounted to the shaft 31 at the other side of gear 32, and two disk clutches which are arranged in the clutch housing 16. There is an input shaft 35 which is driven to rotate by drive flange 35a. On shaft 35 are fixed two gears 36 and 37 which rotate with the shaft. Gear 36 meshes with the large side gear 33 while gear 37 is connected through a reversing, intermediate gear 39 with the small side gear 34.

The middle gear 32 of the shift unit 30 meshes with the middle gear of the shift unit 10. The remainder of the elements of FIG. 3 correspond to those of FIG. 1 and are assembled in the same manner. Driving force is imparted to shaft 11, not through a drive flange 11a, as in FIG. 1, but through gear 32. It is apparent that when one clutch in shift unit 30 is engaged, the drive connection is in one rotational direction, starting from drive flange 35a, through shaft 35, gear 36, large side gear 33 and shaft 31 and gear 32. When the other clutch in shift unit 30 is engaged, the drive connection produces rotation in the opposite rotational direction, starting from drive flange 35a, through shaft 35, gear 37, intermediate reversing gear 39, small side gear 34, shaft 31 and gear 32.

Numerous parts of the transmission of FIG. 3 can be identical three separate times, namely the clutch shafts 11, 21 and 31; the complete disk clutches 16; the middle gears 12, 22 and 32; the large side gears 13, 23 and 33 and the small side gears 14, 24 and 34. Particularly, the shafts 11, 21 and 31 can all have substantially the same size, the pitch diameter of gears 12, 22, 32 can be substantially the same, the pitch diameter of gears 13, 23 and 33 can be substantially the same and the pitch diameter of gears 14, 24 and 34 can be substantially the same. It might be advantageous to develop one of the side gears 33 or 34 of the shift unit 30 differently in order to obtain equal speeds of travel in both of the forward and reverse directions.

The four shafts 35, 31, 11 and 21 can all lie in one plane, as schematically suggested in FIG. 3, if a large center-to-center distance between the input shaft 35 and the output shaft 21 is desired. However, if the center-to-center distance between the input and output shafts is to be smaller, then a folded arrangement, like that shown in FIG. 4, would be selected. FIG. 4 shows the transmission of FIG. 3 in side view. The shafts and the gears of this transmission are marked with the same reference numbers as in FIG. 3. The gears are illustrated symbolically by circles. Only on the gears 14 and 25 there are illustrated some of the gear teeth 41 and 52, respectively. The inner parts (shafts, gears, and clutches) of the transmissions of FIGS. 3 and 4 are identical. Therefore, it is merely necessary to provide different housings for these two differently folded transmissions.

It is normally desired that the four speeds of the transmission of FIG. 1 and the shift units 10 and 20 of FIG. 3 or the three forward speeds of the transmission of FIG. 2 be graduated as uniformly as possible. At the same time, in order to simplify their manufacture all gears should have the same module. It is possible to satisfy both of these requirements by having at least one of the two gear pairs 14, 25 or 15, 24, which is formed with one of the outer gears 15, 25, have a smaller sum of numbers of gear teeth than the gear pairs 12, 23 or 13, 22 that are formed with a middle gear 12, 22. In this connection, the center-to-center distances in all pairs of gears must be the same. Different sums of teeth in two pairs having the same center-to-center spacing and the same module are obtained by making use of the known addendum modification (U.S. Pat. No. 3,116,651). For example, the sum of the number of teeth of the gears 14 and 25 as well as 15 and 24 will be selected to be smaller by one or by two in the transmission of FIG. 1 than the sum of the numbers of teeth of the gears 12 and 23 or 13 and 22. The following table shows an example of the numbers of gear teeth of the gears 12, 13, 14, 15, 22, 23, 24 and 25 of the transmissions shown in FIGS. 1, 3 and 4, and, resulting therefrom, the gear ratios of the four speeds and the graduation (or progression) of the speeds, gained by forming the ratios of two neighbouring gear ratios.

| Gear | Number of teeth | Sum of numbers of teeth | Gear ratio | Speed | Graduation of speeds |
|---|---|---|---|---|---|
| 14 | 34 | 110 | 2,235 | I | |
| 25 | 76 | | | | |
| | | | | | 1,702 |
| 13 | 48 | 111 | 1,313 | II | |
| 22 | 63 | | | | |
| | | | | | 1,723 |
| 12 | 63 | 111 | 0,762 | III | |
| 23 | 48 | | | | |
| | | | | | 1,705 |
| 15 | 76 | 110 | 0,447 | IV | |
| 24 | 34 | | | | |

Although the present invention has been described in connection with the preferred embodiments thereof, many variations and modifications will now become apparent to those skilled in the art. It is preferred, therefore, that the present invention be limited not by the specific disclosure herein, but only by the appended claims.

What is claimed is:

1. A multiple speed transmission, comprising:
   (A) a first and a second shift unit, each said shift unit comprising, respectively:
      (1) a rotatable shaft, the rotatable shaft of said first shift unit being parallel to the rotatable shaft of said second shift unit;
      (2) a first gear fixed for rotation with said shaft;
      (3) a second gear on said shaft and rotatable with respect thereto;
      (4) a third gear on said shaft and rotatable with respect thereto; said third gear having a different pitch diameter than said second gear, said second and third gears being located on opposite sides of said first gear, the diameter of said first gear being greater than the diameter of at least one of said second and third gears;
      (5) clutch means for selectively coupling one of said second and said third gears to rotate together with said first gear, said clutch means including first and second disk clutches arranged on either side of said first gear, said first disk clutch being adapted to selectively couple said first gear to said second gear, said second disk clutch being adapted to selectively couple said first gear to said third gear;
      (6) a fourth gear fixed for rotation with said shaft, said fourth gear being further away, as measured along the axis of said shaft, from said first gear than at least one of said second and third gears;
   (B) said gears of both said shift units being, at least indirectly, in engagement such that said first gear of each said unit is in engagement with and defines a set of gears with said second gear of the other said unit, and said third gear of each said unit is in engagement with and defines a set of gears with said fourth gear of the other said unit, whereby four engaging sets of gears are formed; and
   (C) a reverse transmission connected to said first shift unit for reversing the direction of rotation of said shaft of said first shift unit, said reversing transmission comprising a third shift unit, said third shift unit including:
      (1) a second shaft; a fifth gear fixed to said second shaft for rotation therewith; said fifth gear engaging said first gear of said first shift unit for rotation therewith;
      (2) a sixth gear and a seventh gear located on and being rotatable with respect to said second shaft;
      (3) second clutch means for selectively coupling one of said sixth and seventh gears to rotate with said fifth gear;
      (4) first means for rotating said sixth gear, and thereby for rotating said fifth gear, in one direction when said second clutch means has coupled said fifth and said sixth gears; and
      (5) second means for rotating said seventh gear, and thereby for rotating said fifth gear, in a second, opposite direction when said second clutch means has coupled said fifth and said seventh gear.

2. The multiple speed transmission of claim 1, wherein said gears that are in engagement are all in direct engagement.

3. The multiple speed transmission of any one of claims 1 or 2, wherein each of said shafts have the same size, and each of said first, second, third and fourth gears have substantially the same respective pitch diameters.

4. The multiple speed transmission of one of claims 1 or 2, wherein all said gears have the same module and wherein at least one of said gear sets has a smaller sum of numbers of gear teeth than the other said gear sets.

5. The multiple speed transmission of claim 1, wherein said second gear is larger than said third gear.

6. The multiple speed transmission of claim 1, wherein said sixth gear is larger than said seventh gear.

7. The multiple speed transmission of claim 1, wherein said second shaft has dimensions substantially corresponding to a shaft of said first and said second units; said fifth gear has a pitch diameter substantially corresponding to that of said first gear; one of said sixth and seventh gears has a pitch diameter substantially corresponding to that of said second gear and the other of said sixth and said seventh gears has a pitch diameter substantially corresponding to that of said third gear.

8. The multiple speed transmission of claim 1, wherein all said gears have the same module and wherein at least one of said gear sets has a smaller sum of numbers of gear teeth than the other gear sets.

9. The multiple speed transmission of any one of claims 1, 7 or 8, wherein each of said shafts have the same size, and each of said first, second, third and fourth gears have substantially the same respective pitch diameters.

10. The multiple speed transmission of claim 1, wherein both said first and said second means comprise a common third shaft;
    said first means further comprise an eighth gear fixed on said third shaft and rotatable therewith and comprise an intermediate gear engaging said eighth gear and engaging one of said sixth and said seventh gears for transmitting rotation of said eighth gear to the engaged one of said sixth and said seventh gears;
    said second means further comprise a ninth gear fixed on said third shaft and rotatable therewith and engaging the other of said sixth and said seventh gears for transmitting rotating of said ninth gear to the other of said sixth and said seventh gears.

11. The multiple speed transmission of claim 10, wherein said ninth gear is larger than said eighth gear.

12. The multiple speed transmission of claim 10, wherein each of said shafts have the same size, and each of said first, second, third and fourth gears have substantially the same respective pitch diameters.

13. The multiple speed transmission of claim 10, wherein all said gears have the same module and wherein at least one of said gear sets has a smaller sum of numbers of gear teeth than the other said gear sets.

14. The multiple speed transmission of claim 10, wherein said second shaft has dimensions substantially corresponding to a shaft of said first and said second shift units; said fifth gear has a pitch diameter substantially corresponding to that of said first gear; one of said sixth and seventh gears has a pitch diameter substantially corresponding to that of said second gear and the other of said sixth and said seventh gears has a pitch diameter substantially corresponding to that of said third gear.

15. The multiple speed transmission of claim 14 wherein said second and said seventh gears are larger in their respective pitch diameters than said third and said sixth gears.

16. The multiple speed transmission of claim 14, wherein all said gears have the same module and wherein at least one of said gear sets has a smaller sum of numbers of gear teeth than the said gear sets formed with said first gears.

* * * * *